(12) United States Patent
Li

(10) Patent No.: US 8,284,653 B2
(45) Date of Patent: Oct. 9, 2012

(54) USER SIGNAL TRANSMITTING AND RECEIVING METHOD, APPARATUS AND SYSTEM IN OFDMA SYSTEM

(75) Inventor: Hang Li, Beijing (CN)

(73) Assignee: Beijing Xinwei Telecom Technology Inc., Beijing (CN)

( * ) Notice: Subject to any disclaimer, the term of this patent is extended or adjusted under 35 U.S.C. 154(b) by 237 days.

(21) Appl. No.: 12/680,411

(22) PCT Filed: Sep. 27, 2008

(86) PCT No.: PCT/CN2008/072578
§ 371 (c)(1),
(2), (4) Date: Mar. 26, 2010

(87) PCT Pub. No.: WO2009/043310
PCT Pub. Date: Apr. 9, 2009

(65) Prior Publication Data
US 2010/0296385 A1 Nov. 25, 2010

(30) Foreign Application Priority Data
Sep. 27, 2007 (CN) .......................... 2007 1 0122582

(51) Int. Cl.
*H04J 11/00* (2006.01)

(52) U.S. Cl. ...................................... 370/210; 375/260

(58) Field of Classification Search .......... 370/203–210, 370/328–330, 338, 341–345; 375/260–265
See application file for complete search history.

(56) References Cited

U.S. PATENT DOCUMENTS

2005/0249322 A1* 11/2005 Gerlach .................... 375/355
2007/0177631 A1* 8/2007 Popovic et al. ............. 370/478

FOREIGN PATENT DOCUMENTS

| CN | 1893337 A | 1/2007 |
|---|---|---|
| CN | 1909536 A | 2/2007 |
| WO | 2005/022681 A2 | 3/2005 |
| WO | 2006/118432 A1 | 11/2006 |

OTHER PUBLICATIONS

International Search Report: PCT/CN2008/072578.

* cited by examiner

*Primary Examiner* — Ricky Ngo
*Assistant Examiner* — Kan Yuen
(74) *Attorney, Agent, or Firm* — Ladas & Parry LLP

(57) ABSTRACT

This invention provides a user signal transmitting method in an OFDMA system, where all the time-frequency grids of each timeslot are divided into sub-channels, each sub-channel comprises $N_f$ sub-carriers overlapping in time, $N_f \geq 4$, and in each sub-channel, a maximum value of a frequency interval between adjacent sub-carriers is no less than three times of a minimum value thereof; and when a user message is sent, comprising: generating a modulating signal; allocating a time-frequency grid set which is a union set of sub-channel, where the sub-channel's quantity is determined by the user message's size, and the sub-channel's time-frequency position is selected according to a rule; and mapping the modulating signal to the time-frequency grid set to generate a frequency-domain signal; performing IFFT on the frequency-domain signal to generate a time-domain signal for transmission. This invention also provides a corresponding user signal receiving method, user signal transmitting and receiving apparatus and access system.

20 Claims, 7 Drawing Sheets

(a) Band overlaps entirely

☐ Clean band

▨ Overlapped band (b) Band overlaps partially

USER SIGNAL TRANSMITTING AND RECEIVING METHOD, APPARATUS AND SYSTEM IN OFDMA SYSTEM

FIELD OF THE INVENTION

The present invention relates to an Orthogonal Frequency-Division Multiple Access (OFDMA) technology and particularly, to a user signal transmitting method and apparatus, a user signal receiving method and apparatus, and an access system in an OFDMA smart antenna communication system.

BACKGROUND OF THE INVENTION

For an OFDMA wireless system supporting hybrid communication of data and voice, a narrowband user and a broadband user may access the wireless system simultaneously. Therefore, there is a need to plan a sub-carrier flexibly to adapt to service traffic variation in real time. On the other hand, a narrowband service has much higher requirements for signal reception quality. Particularly, factors such as frequency and time selectivity of a mobile channel, frequency and time selectivity of co-frequency interference, inter-symbol and inter-carrier interference resulted from serious multipath, interference resulted from circuit nonlinearity and phase noise may all lead to a significant decrease in the signal reception quality.

SUMMARY OF THE INVENTION

An embodiment of the present invention provides a user signal transmitting method in an Orthogonal Frequency-Division Multiple Access (OFDMA) system, wherein the OFDMA system includes multiple terminals and multiple Base Transceiver Stations (BTS), a user communicates with the BTS via the terminal, and in an OFDMA access manner, a radio resource is divided into multiple two-dimensional time-frequency grids, and wherein all the time-frequency grids of each timeslot is divided into multiple sub-channels, in which each sub-channel includes $N_f$ sub-carriers overlapping in time, where $N_f \geq 4$, and in the $N_f$ sub-carriers included in each sub-channel, a maximum value of a frequency interval between adjacent sub-carriers is three times or more than three times of a minimum value of the frequency interval between the adjacent sub-carriers; and, when any one of the terminal and the BTS acts as a transmitter used for transmitting a user message of the user, the method includes:

generating a modulating signal of the user based on the user message to be sent;

mapping the modulating signal of the user to a time-frequency grid set allocated by a network side to the user, to generate a frequency-domain signal of the user, wherein the time-frequency grid set is a union set of one or more sub-channels, in which a quantity of sub-channel is determined by a size of the user message, and a time-frequency position of the sub-channel is selected according to a predetermined rule; and performing Inverse Fast Fourier Transform on the frequency-domain signal of the user to generate a time-domain signal of the user, and transmitting the time-domain signal.

An embodiment of the present invention further provides a user signal receiving method in an Orthogonal Frequency-Division Multiple Access (OFDMA) system, wherein the OFDMA system includes multiple terminals and multiple Base Transceiver Stations (BTS), a user communicates with the BTS via the terminal, and in an OFDMA access manner, a radio resource is divided into multiple two-dimensional time-frequency grids, and wherein all the time-frequency grids of each timeslot are divided into multiple sub-channels, in which each sub-channel includes $N_f$ sub-carriers overlapping in time, where $N_f \geq 4$, and in the $N_f$ sub-carriers included in each sub-channel, a maximum value of a frequency interval between adjacent sub-carriers is three times or more than three times of a minimum value of the frequency interval between the adjacent sub-carriers; and, when any one of the terminal and the BTS acts as a receiver used for receiving a user message of the user, the method includes:

performing, in turn, Fast Fourier Transform and inverse mapping on a time-domain signal of the user to obtain a modulating signal of the user, wherein the inverse mapping is based on a time-frequency grid set allocated by a network side to the user, where the time-frequency grid set is a union set of one or more sub-channels, in which a quantity of sub-channel is determined by a size of the user message, and a time-frequency position of the sub-channel is selected according to a predetermined rule;

learning a spatial and time-frequency characteristic of an interference from one or more null signals respectively in one or more time-frequency grids included in each sub-channel using the modulating signal of the user, and performing interference suppression using the spatial and time-frequency characteristic of the interference obtained from the learning, wherein the one or more null signals are inserted into the one or more time-frequency grids included in each sub-channel by the transmitter of the user message in generating a frequency-domain signal; and, demodulating the modulating signal of the user with the interference suppression being performed to obtain the user message of the user.

An embodiment of the present invention further provides a user signal transmitting apparatus in an Orthogonal Frequency-Division Multiple Access (OFDMA) system, wherein in an OFDMA access manner, a radio resource is divided into multiple two-dimensional time-frequency grids, and wherein all the time-frequency grids of each timeslot are divided into multiple sub-channels, in which each sub-channel includes $N_f$ sub-carriers overlapping in time, where $N_f \geq 4$, and in the $N_f$ sub-carriers included in each sub-channel, a maximum value of a frequency interval between adjacent sub-carriers is three times or more than three times of a minimum value of the frequency interval between the adjacent sub-carriers; and, the apparatus includes:

a message modulating unit, adapted to generate a modulating signal of a user based on a user message to be sent from the user;

a modulating signal mapping unit, adapted to map the modulating signal of the user from the message modulating unit to a time-frequency grid set allocated by a network side to the user, to generate a frequency-domain signal of the user, wherein the time-frequency grid set is a union set of one or more sub-channels, in which a quantity of sub-channel is determined by a size of the user message, and a time-frequency position of the sub-channel is selected according to a predetermined rule; and, an Inverse Fast Fourier Transform (IFFT) transmitting unit, adapted to perform Inverse Fast Fourier Transform on the frequency-domain signal of the user from the modulating signal mapping unit to generate a time-domain signal of the user, and to transmit the time-domain signal.

An embodiment of the present invention further provides a user signal receiving apparatus in an Orthogonal Frequency- Division Multiple Access (OFDMA) system, wherein in an OFDMA access manner, a radio resource is divided into multiple two-dimensional time-frequency grids, and wherein all the time-frequency grids of each timeslot are divided into multiple sub-channels, in which each sub-channel includes $N_f$ sub-carriers overlapping in time, where $N_f \geq 4$, and in the $N_f$ sub-carriers included in each sub-channel, a maximum value of a frequency interval between adjacent sub-carriers is three times or more than three times of a minimum value of the frequency interval between the adjacent sub-carriers; and the apparatus is adapted to receive a user message from a user, and includes:

a Fast Fourier Transform (FFT) receiving unit, adapted to receive a time-domain signal of the user, and to perform Fast Fourier Transform on the time-domain signal of the user;

an inverse mapping unit, adapted to perform inverse mapping on the signal from the FFT receiving unit based on a time-frequency grid set allocated by a network side to the user to obtain a modulating signal, wherein the time-frequency grid set is a union set of one or more sub-channels, in which a quantity of sub-channel is determined by a size of the user message, and a time-frequency position of the sub-channel is selected according to a predetermined rule;

an interference suppressing unit, adapted to learn a spatial and time-frequency characteristic of an interference from one or more null signals in each sub-channel therein using the modulating signal from the inverse mapping unit, and to perform interference suppression on the modulating signal using the spatial and time-frequency characteristic of the interference obtained from the learning; and, a demodulating unit, adapted to demodulate the modulating signal with the interference suppression being performed from the interference suppressing unit to obtain the user message.

An embodiment of the present invention further provides a user signal transmitting system of Orthogonal Frequency-Division Multiple Access (OFDMA), including: at least one Base Transceiver Station (BTS) and at least one terminal, wherein a user communicates with the BTS via the terminal, and in an OFDMA access manner, a radio resource is divided into multiple two-dimensional time-frequency grids, and wherein the terminal is adapted to generate, when transmitting a user message of the user to the BTS, a modulating signal of the user based on the user message to be sent; to map the modulating signal of the user to a time-frequency grid set allocated by the BTS to itself, and to insert one or more null signals respectively into the one or more time-frequency grids included in each sub-channel to generate a frequency-domain signal of the user; and to perform Inverse Fast Fourier Transform on the frequency-domain signal of the user to generate a time-domain signal of the user, and to transmit the same; and the BTS is adapted to allocate the sub-channel, wherein all the time-frequency grids of each timeslot are divided into multiple sub-channels, in which each sub-channel includes $N_f$ sub-carriers overlapping in time, where $N_f \geq 4$, and in the $N_f$ sub-carriers included in each sub-channel, a maximum value of a frequency interval between adjacent sub-carriers is three times or more than three times of a minimum value of the frequency interval between the adjacent sub-carriers; to allocate a time-frequency grid set to the user when receiving the user message from the terminal, wherein the time-frequency grid set is a union set of one or more sub-channels, in which a quantity of sub-channel is determined by a size of the user message, and a time-frequency position of the sub-channel is selected according to a predetermined rule; to perform, in turn, Fast Fourier Transform and inverse mapping on the time-domain signal of the user from the terminal to obtain the modulating signal of the user; to learn a spatial and time-frequency characteristic of an interference from the one or more null signals in the one or more time-frequency grids included in each sub-channel using the modulating signal of the user; and to perform interference suppression on the modulating signal of the user using the spatial and time-frequency characteristic of the interference obtained from the learning, and to demodulate the modulating signal of the user with the interference suppression being performed to obtain the user message of the user.

An embodiment of the present invention further provides a user signal transmitting system of Orthogonal Frequency-Division Multiple Access (OFDMA), including: at least one Base Transceiver Station (BTS) and at least one terminal, wherein a user communicates with the BTS via the terminal, and in an OFDMA access manner, a radio resource is divided into multiple two-dimensional time-frequency grids, and wherein the BTS is adapted to allocate the sub-channel, wherein all the time-frequency grids of each timeslot are divided into multiple sub-channels, in which each sub-channel includes $N_f$ sub-carriers overlapping in time, where $N_f \geq 4$, and in the $N_f$ sub-carriers included in each sub-channel, a maximum value of a frequency interval between adjacent sub-carriers is three times or more than three times of a minimum value of the frequency interval between the adjacent sub-carriers; to generate, when transmitting a user message of the user to the terminal, a modulating signal of the user based on the user message to be sent; to map the modulating signal of the user to a time-frequency grid set allocated by itself to the user, and to insert one or more null signals respectively into one or more time-frequency grids included in each sub-channel to generate a frequency-domain signal of the user; and to perform Inverse Fast Fourier Transform on the frequency-domain signal of the user to generate a time-domain signal of the user, and to transmit the same, wherein the time-frequency grid set is a union set of one or more sub-channels, in which a quantity of sub-channel is determined by a size of the user message, and a time-frequency position of the sub-channel is selected according to a predetermined rule; and the terminal is adapted to perform, in turn, Fast Fourier Transform and inverse mapping on the time-domain signal of the user from the BTS, to obtain the modulating signal of the user; to learn a spatial and time-frequency characteristic of an interference from the one or more null signals in the one or more time-frequency grids included in each sub-channel using the modulating signal of the user; and to perform interference suppression on the modulating signal of the user using the spatial and time-frequency characteristic of the interference obtained from the learning, and to demodulate the modulating signal of the user with the interference suppression being performed to obtain the user message of the user.

DETAILED DESCRIPTION OF THE INVENTION

Hereinafter, specific embodiments of the present invention are described in more detail with reference to the accompanying drawings.

Figure 1:
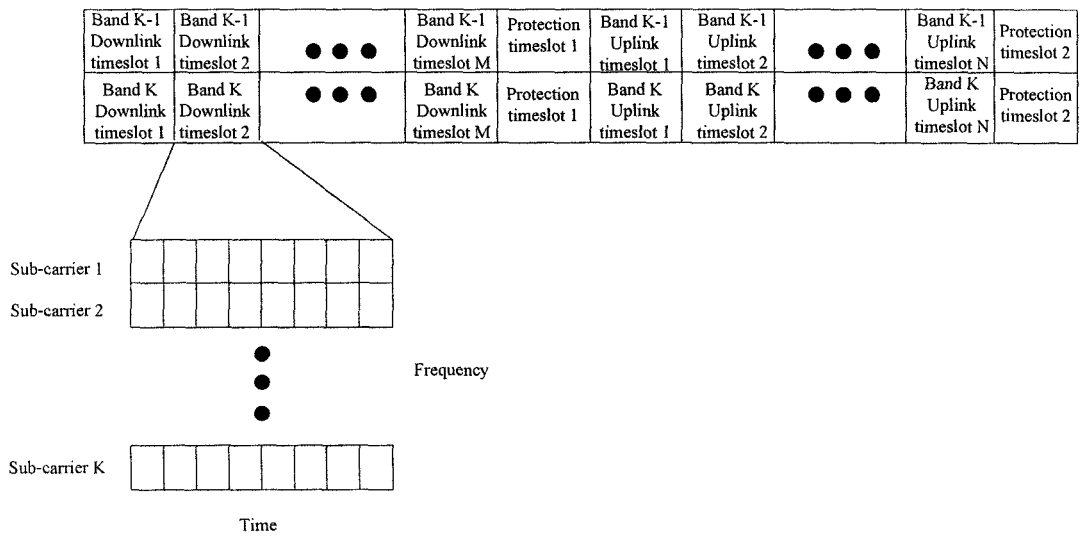
FIG. 1 is a diagram illustrating a typical frame structure of an OFDM-Time-Division Multiple Access (OFDMA-TDMA) Time Division Duplexing (TDD) system.

In an OFDMA-TDMA multiplexing scheme, spectrum is divided into multiple sub-carriers, and time is divided into continuous timeslots, in which each timeslot is composed of multiple symbol periods. Therefore, in an OFDMA system, radio resources may be represented as two-dimensional time-frequency grids. In a Time Division Duplexing (TDD) system, each timeslot is configured as a downlink timeslot, an uplink timeslot or a protection timeslot. FIG. 1 shows a frame structure of a typical OFDMA-TDMA TDD system.

Figure 2:
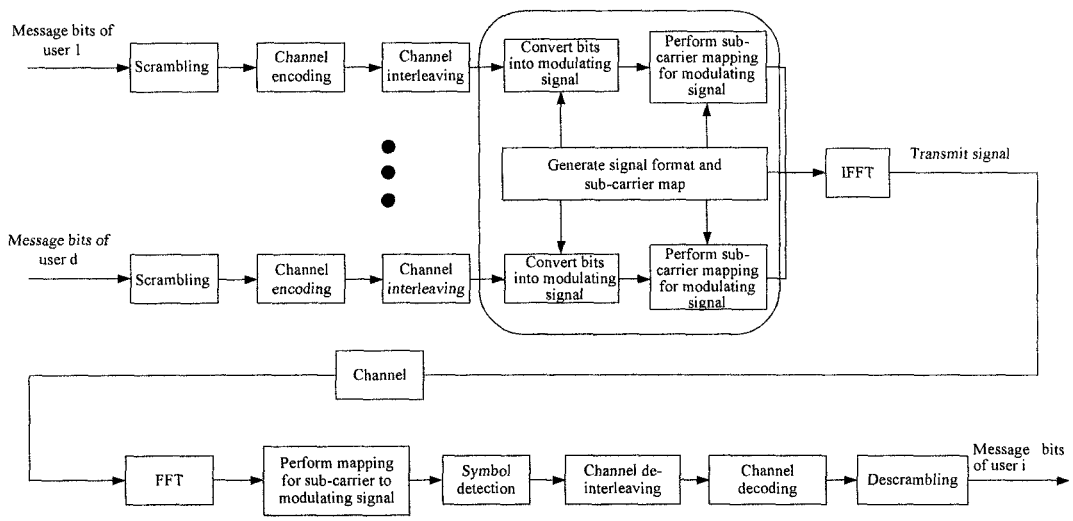
FIG. 2 is a schematic block diagram illustrating a downlink signal transmission procedure.

An OFDMA downlink signal is single-point-to-multipoint while an OFDMA uplink signal is multipoint-to-single-point. In FIG. 2, a downlink transmission signal is generated by mapping a modulating signal of each user to the time-frequency grids allocated to the user. According to bandwidth requirements of users, the modulating signal of these users may fill part or all of the time-frequency grids. A signal format and a sub-carrier mapping module specify a modulation manner, an encoding manner and an encoding rate and etc., and also provide a sub-carrier map of each user. After the mapping of the modulating signal to the sub-carrier is completed, $N_{fft}$-point Inverse Fast Fourier Transform is performed on the time-frequency grids of all the downlink timeslots, to generate a downlink basic time-domain signal having a length of one symbol. Assuming that a digital sampling rate is fs, the length of the basic time-domain signal of each symbol is $T_s = f_s N_{fft}$, and a frequency interval between adjacent sub-carriers is $1/T_s$. Then cyclic extension is performed for each symbol, so that the symbol is lengthened to $(1+\alpha)T_s$. An ith user terminal performs $N_{fft}$-point Fast Fourier Transform on a received downlink timeslot signal to produce the time-frequency grid containing the modulating signal. The terminal uses the sub-carrier map in a Base Transceiver Station (BTS) that is adopted by the same user to demodulate the received modulating signal of the time-frequency grid. The terminal may obtain the sub-carrier map from a downlink control message, and then performs symbol detection on the received modulating signal to obtain the symbol or bit information required for subsequent channel decoding.

Figure 3:
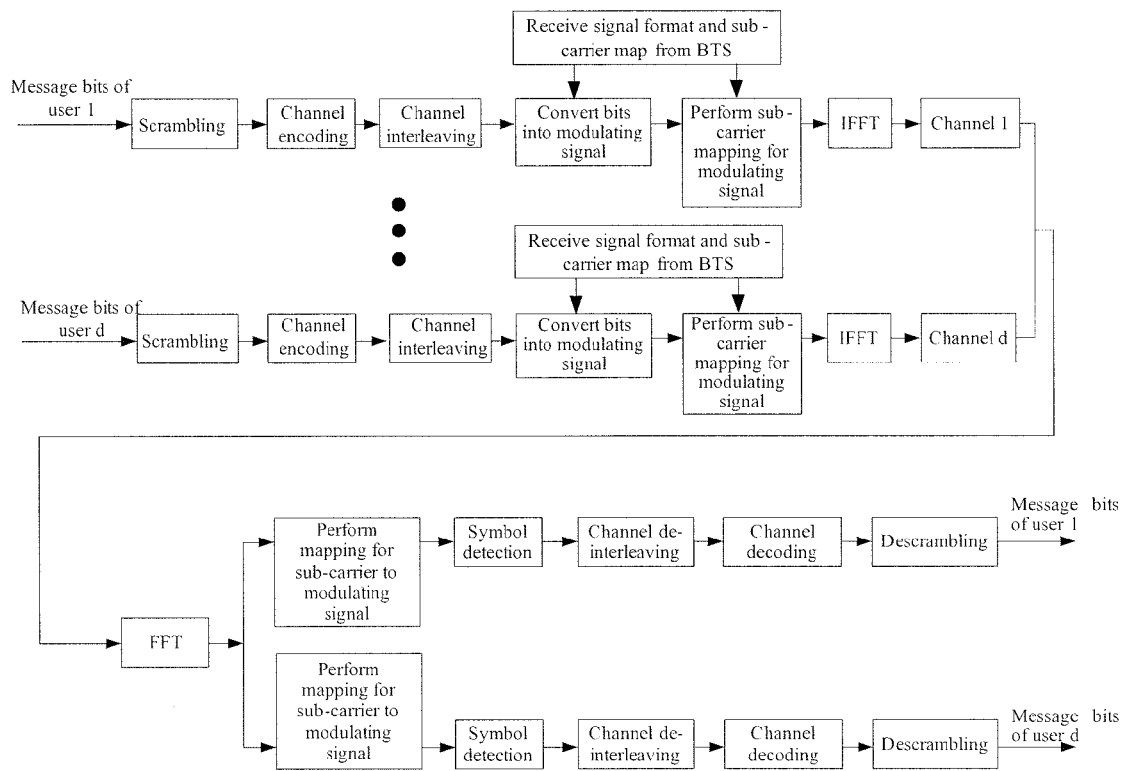
FIG. 3 is a schematic block diagram illustrating an uplink signal transmission procedure.

FIG. 3 shows a baseband model of an uplink signal transmission block diagram. Uplink function is similar to downlink function. However, it is required to transmit the uplink signal format and the sub-carrier map from the BTS to the terminal through the control message. After receiving the signal format and the sub-carrier map, the terminal may produce the corresponding uplink signal. As normal synchronization, there may be more than one terminal that emits the uplink signal simultaneously. The BTS should be able to detect and decode the respective message using the signal format and the sub-carrier map corresponding to each terminal.

For the uplink and the downlink, the production of the modulating signal conforms to a common signal generation procedure, referring to FIGS. 2 and 3: for the uth user, firstly original bits $a_1^u, \ldots, a_N^u$ is scrambled to obtain scrambled bits $b_1^u, \ldots, b_N^u$, then channel encoding is performed for the scrambled bits, e.g., forward error correction control encoding is performed to obtain coded bits $c_1^u, \ldots, c_Q^u$, then an interleaver performs channel interleaving on the coded bits, and $d_1^u, \ldots, d_Q^u$ output from the interleaver is then converted into a channel symbol $e_1^u, \ldots, e_o^u$. At this time, there may be two transmission processing method for the channel symbol:

1. One transmission processing method is as the traditional OFDMA system, where the channel symbol is used as the modulating signal directly. According to a predetermined sub-carrier map $C_u$, the channel symbol $e_1^u, \ldots, e_o^u$ is mapped to the time-frequency grids, where $C_u$ includes a timeslot index and a sub-carrier index allocated to the user. Assuming that a matrix $X_{dl}$ represents all the downlink time-frequency grids, $X_{dl}$ is $N_{fft} \times N_{sym}$ dimensional, where $N_{fft}$ is a quantity of points of the Fast Fourier Transform, and $N_{sym}$ is a total quantity of the downlink symbols. The first step for producing the signal is to map the symbol to the sub-carrier as a method illustrated in the following formula.

for $i=1, \ldots, N_u$ $$X_{dl}(C_u) = [e_1^u, \ldots, e_o^u]$$

end

Then, Inverse Fast Fourier Transform (IFFT) is performed on each column of $X_{dl}$ and an emission signal $Y_{dl}$ is produced, as a method illustrated in the following formula.

for $i=1, \ldots, N_{sym}$ $$Y_{dl}(:,t) = \text{IFFT}(X_{dl}(:,t))$$

end

2. Another transmission processing method is as illustrated in the following formula, which includes: firstly the channel symbol $e_1^u, \ldots, e_o^u$ is code-spread to generate a modulating signal $f_1^u, \ldots, f_p^u$, then the modulating signal $f_1^u, \ldots, f_p^u$ is mapped to the time-frequency grids, where the resulting signal is called a Code Spread OFDM (CS-OFDM) signal.

$$[f_1^u, \ldots, f_p^u] = [e_1^u, \ldots, e_o^u] \cdot A$$

for $i=1, \ldots, N_u$ $$X_1(C_u) = [f_1^u, \ldots, f_o^u]$$

end for $i=1, \ldots, N_{sym}$ $$Y_{dl}(:,t) = \text{IFFT}(X_{dl}(:,t))$$

end

Here, A is a code spread matrix.

The uplink signal may be produced using a similar method. For the general OFDMA system, the uplink signal is given by the following formula:

$$X_{ul}(C_u) = [e_1^u, \ldots, e_o^u]$$

for $i=1, \ldots, N_{sym}$ $$Y_{ul}(:,t) = \text{IFFT}(X_{ul}(:,t))$$

end

For the CS-OFDMA system, the uplink signal is given by the following formula:

$$[f_1^u, \ldots, f_p^u] = [e_1^u, \ldots, e_o^u] \cdot A$$

$$X_{ul}(C_u) = [f_1^u, \ldots, f_o^u]$$

for $i = 1, \ldots, N_{sym}$ $$Y_{ul}(:,t) = \text{IFFT}(X_{ul}(:,t))$$

end

Figure 4:
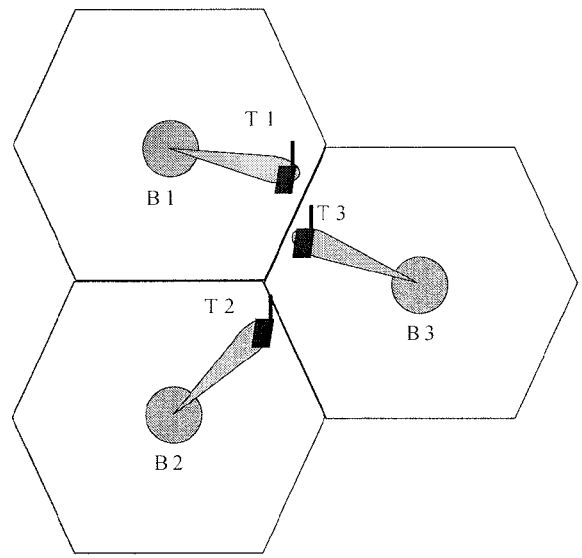
FIG. 4 is a diagram illustrating a cell interference geometrical model.

In order to increase the frequency efficiency of the wireless network, it is typically desired that a signal transmission and reception scheme is designed as all adjacent cells using the same wireless frequency. A direct result of such frequency design scheme is that multi-cell interference is introduced, and system throughput may be greatly decreased. In other words, the modulating signal output from the Fast Fourier Transform (FFT) module of FIG. 2 and FIG. 3 includes not only the wanted signal but also the interference signal from another cell. FIG. 4 shows an interference geometrical model, where the Base Transceiver Stations (BTS) B1, B2 and B3 are run on the overlapping spectrum having a bandwidth of at least $B_{scg}$. The terminals T1, T2 and T3 use the sub-carrier in the overlapping spectrum to communicate with their respective Base Transceiver Stations. If the sub-carrier set allocated to the three terminals overlaps at least in part, when the Base Transceiver Station B2 communicates with the terminal T2, the Base Transceiver Station B2 and/or the terminal T2 may also generate up/downlink interference on the terminal T1 and the terminal T3. If the sub-carrier set allocated to the three terminals (T1, T2 and T3) does not overlap with each other, the communication of the three terminals does not interfere with each other. Alternatively, if the BTS and/or the terminal are provided with multiple antennae, the interference can be reduced by using nulling algorithm in the receiver of the BTS and/or the terminal.

Figure 5:
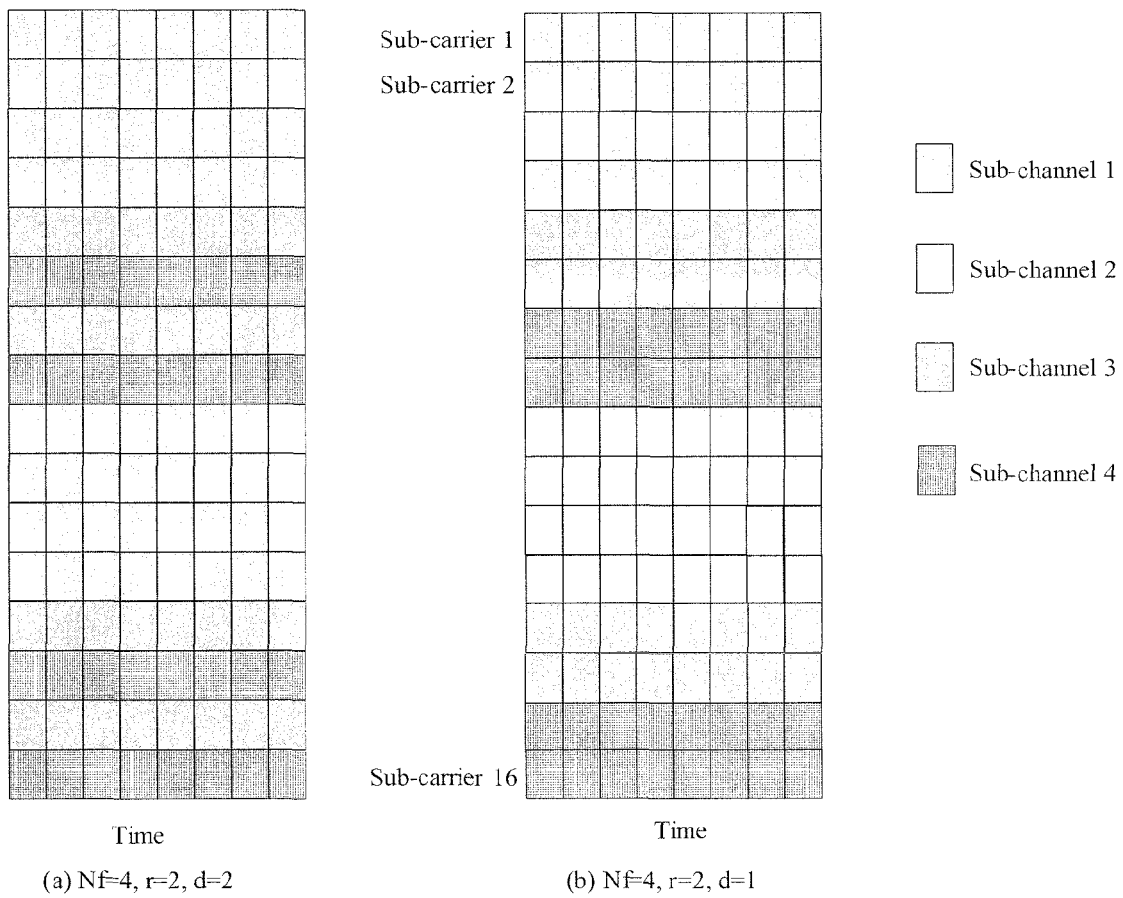
FIG. 5 is a schematic diagram illustrating a sub-carrier allocation scheme used for all sectors.

In a specific embodiment of the present invention, all the time-frequency grids of each timeslot are divided into multiple sub-channels. Each sub-channel includes $N_f$ sub-carriers and $N_t$ symbols. The sub-channel is the smallest radio resource allocation unit. Specifically, the $N_f$ sub-carriers included in each sub-channel overlap in time, where $N_f \geq 4$, and the maximum value of the frequency interval of the adjacent sub-carriers is three times or more than three times of the minimum value of the frequency interval of the adjacent sub-carriers. Preferably, $N_f$ is a multiple of the parameter r ($r \geq 2$), unless otherwise specified, e.g., a direct current sub-carrier is prevented from signal emission. The $N_f$ sub-carriers are further divided into r groups, where each group contains $N_f/r$ sub-carriers. The frequency interval of the sub-carrier in each group is large enough, and frequency diversity may be implemented after signal detection or signal decoding. A preferred manner is as follows: the $N_f/r$ sub-carriers of the first group are spread uniformly to the frequency band having a predetermined size of $B_{scg}$, thus the frequency interval of the sub-carrier in such group is a multiple of $B_{scg} \cdot r/N_f$; the sub-carrier of the second group is obtained by moving all the sub-carrier of the first group down d sub-carriers; the sub-carrier of the third group is obtained by moving all the sub-carrier of the second group down d·2 sub-carriers; and so on for the other groups, i.e., the sub-carrier of the kth group is obtained by moving all the sub-carrier of the (k−1)th group down d·(k−1) sub-carriers. Preferably, the spectrum range of all the sub-carriers contained in any sub-channel is limited within a predetermined value $B_{scg}$. A preferred value of $B_{scg}$ is 1 MHZ. There are two preferred sub-channel-sub-carrier allocation schemes. In FIG. 5, part (a) shows the sub-channel-sub-carrier allocation scheme in the condition of $N_f=4$, $r=2$ and $d=2$, and part (b) shows the sub-channel-sub-carrier allocation scheme in the condition of $N_f=4$, $r=2$ and $d=1$. All sectors use the same sub-channel-sub-carrier allocation scheme, thus both interference avoidance and interference null steering can be implemented easily.

Figure 7:
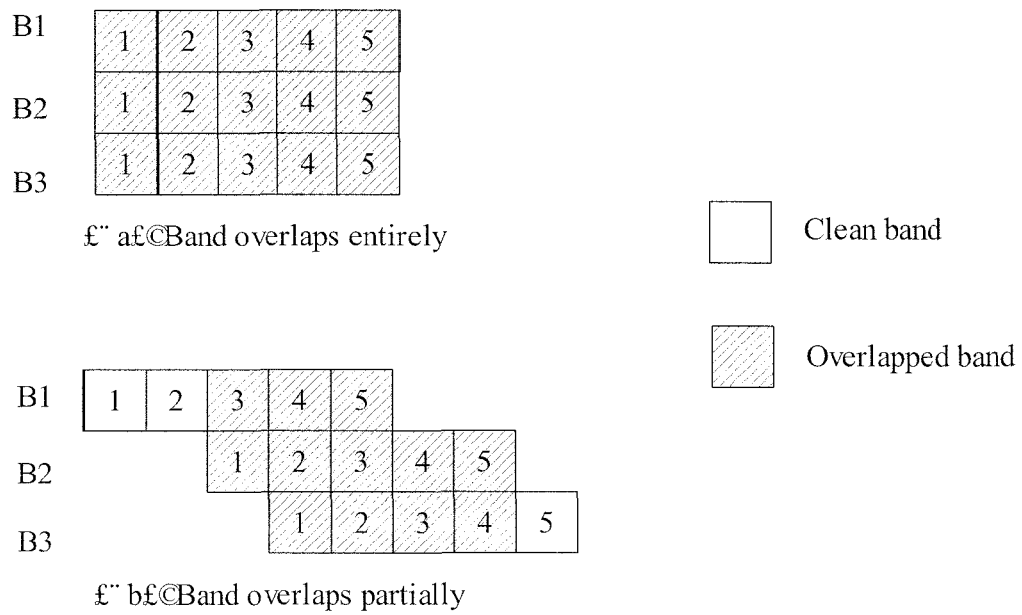
FIG. 7 is an exemplary diagram illustrating spectrum bands used by adjacent sectors.

For a configuration that multiple adjacent sectors are run on the overlapping spectrum band, a preferred manner is to make the size of the overlapping spectrum to be a multiple of $B_{scg}$. FIG. 7 shows a spectrum allocation example on the overlapping spectrum for such adjacent sectors. In FIG. 7, a time-frequency grid is used to represent a sub-band, the time-frequency grid filled with inclined lines represents the overlapping band, and the blank time-frequency grid represents a clean band. As illustrated in FIG. 7, the bands of the three sectors (the sectors B1, B2 and B3) shown in part (a) overlap totally, where each sector contains five sub-bands, and all the five sub-bands are overlapping; the bands of the three sectors (the sectors B1, B2 and B3) shown in part (b) overlap partially, where each sector contains five sub-bands, sectors B1 and B2 overlap in three sub-bands, sectors B2 and B3 overlap in four sub-bands, and sectors B1 and B3 overlap in two sub-bands.

Figure 6:
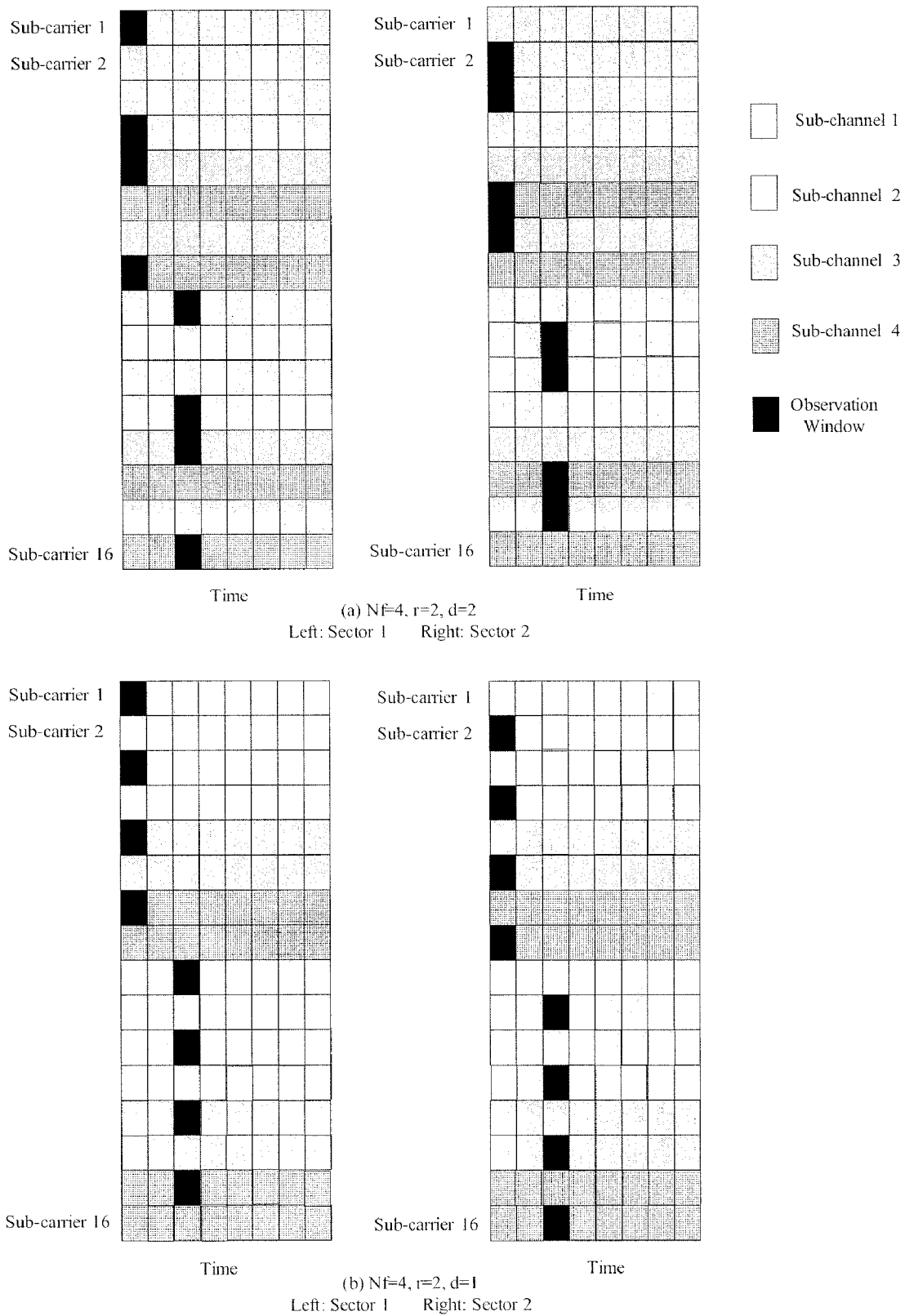
FIG. 6 is a schematic diagram illustrating the sub-carrier allocation scheme used for all sectors that has an observation window.

In order to suppress the interference effectively, an observation window may be enabled to find out characteristics such as the time, frequency, space of the interference. Each observation window occupies the time of one symbol of a sub-carrier, and may be represented by a time-frequency grid. The observation window does not transfer energy. One or more observation windows are defined for each sub-channel. The relative position of the observation window of each sub-channel is determined by a sub-channel index and a sector index. For the sub-channel defined with the observation window, two preferred sub-channel-sub-carrier allocation schemes of the adjacent cells are as illustrated in FIG. 6. In part (a) of FIG. 6, the parameters are $N_f=4$, $r=2$ and $d=2$, and in part (b) of FIG. 6, the parameters are $N_f=4$, $r=2$ and $d=1$, where each of the parameters represents the same meaning as in FIG. 5. In each scheme, two observation windows are defined for each sub-channel. The position of the observation window is determined by a numeral pair. The numeral pair includes: the relative sub-carrier position and the symbol position in the time-frequency grid set allocated to the sub-channel, which may be represented as (relative sub-carrier position, symbol position). Here, the observation window is a null signal. Specifically, the relative sub-carrier position refers to the relative position of the sub-carrier in the sub-channel where it is located. Part (a) of FIG. 6 shows the relative position of the observation window in the sector 1 and the sector 2, where the sub-channel 1 of the sector 1 has an observation window with the relative position of (1, 1) and (3, 3), the sub-channel 2 of the sector 1 has an observation window with the relative position of (2, 1) and (4, 3), the sub-channel 3 of the sector 1 has an observation window with the relative position of (1, 1) and (3, 3), and the sub-channel 4 of the sector 1 has an observation window with the relative position of (2, 1) and (4, 3). The sub-channel-sub-carrier allocation scheme of the sector 2 is consistent with that of the sector 1. However, in order to let the receiver observe the multi-cell interference, the relative position of the observation window of the sub-channel i of the sector 2 may be different from that of the sub-channel i of the sector 1. To be specific, the sub-channel 1 of the sector 2 has an observation window in the relative position of (2, 1) and (4, 3), the sub-channel 2 of the sector 2 has an observation window in the relative position of (1, 1) and (3, 3), the sub-channel 3 of the sector 2 has an observation window in the relative position of (2, 1) and (4, 3), and the sub-channel 4 of the sector 2 has an observation window in the relative position of (1, 1) and (3, 3). The sector 1 and the sector 2 shown in part (b) of FIG. 6 conform to the same observation window allocation rule, where the position of the observation window allocated to the sub-channel i of the sector j shall not overlap in the time-frequency grid with the position of the observation window of the sub-channel i of the sector k, here j≠k. Herein, the sub-carrier i represents the ith sub-carrier, the (sub-)channel i represents the ith (sub-) channel, and the sector i represents the ith sector, where i is an integer.

Assuming that the total quantity of the sub-carriers of each band having a size of $B_{scg}$ is $N_{bf}$ and the total quantity of the bands is $N_{band}$, in each timeslot, the total quantity of the sub-carriers is $N_{bf}*N_{band}$ (for conciseness, here the direct current sub-carrier and the edge sub-carrier is temporarily excluded from consideration), and the total quantity of the sub-channels is $N_{sch}=N_{bf}*N_{band}/N_f$. Therefore, the quantity of the sub-channels in each band is $N_{sch\_band}=N_{bf}/N_f$. According to the above allocation scheme, the sub-carrier index allocated to the sub-channel i is determined by the following formula:

$scg\text{Index}(i)=\text{floor}(i/N_{sch\_band})$ $sch\text{Index}(i)=i-scg\text{Index}(i)\cdot N_{bf}$ $gap=N_{bf}/N_f r$ $C_i^j(k)=k\cdot gap+scg\text{Index}(i)\cdot N_{bf}+d\cdot j+\text{mod}(sch\text{Index}(i),d)+\text{floor}(sch\text{Index}/d)\cdot d\cdot r$ $k=0,\ldots,N_f/r$ $j=0,\ldots,r-1$ Here, the sub-carrier index set allocated to the sub-channel i is equal to the union set of the set $C_i^j$, j=0, . . . , r−1. For convenience, the radio resource is allocated by using the sub-channel as the unit. Therefore, the sub-channel index set is defined as the allocation manner. Once the allocated sub-channel manner $S_u$ is determined for the user, the corresponding sub-carrier manner $C_u$ of the user is determined by the following formula:

$$C_u = \bigcup_{i \in S_u} \bigcup_{j=0}^{r-1} C_i^j$$

Note that $C_u$ is independent from the sector index. Once the sub-carrier set of each timeslot is assigned, the signal may be generated according to the process depicted in FIG. 2 and FIG. 3. If as illustrated in FIG. 4 and FIG. 5, there is an overlapping band between the adjacent sectors, the signal received by the terminal and the BTS may contained the wanted signal and the interference signal. Because the sub-channel-sub-carrier mapping scheme is independent from the sector index, after the received signal is converted to the frequency domain through the FFT operation, a sub-carrier of the channel j of the sector q may be subjected to the interference from the sub-carrier of the channel j of the sector p that has the same relative position. The transmission signal received by the antenna m, the sub-carrier k and the symbol position n of the sector p is as illustrated in the following formula:

$X_m^p[k,n]=S_m^p[k,n]+J_m^q[k,n]+V_m^p[k,n]$

Here, $S_m^p[k, n]$ is the wanted signal of the sector p, $J_m^q[k, n]$ is the interference from the sector q, and $V_m^p[k, n]$ is thermal noise.

If the observation window is defined in each sub-channel and the position of the observation window of the sub-channel j of the sector p is different from the position of the observation window of the sub-channel j of the sector p, the receiver of the sector p may use the signal of the observation window to observe the interference from the sector q that is as illustrated in the following formula:

$Z_m^p[k,n]=J_m^q[k,n]+V_m^p[k,n]$ $Z_m^p[k,n], m=1,\ldots,M$

Therefore, the interference observed by the observation window includes both the interference and the spatial characteristic of the noise. If only the quantity of the reception antennae M is larger than 1, the interference can be reduced using the nulling algorithm.

In an example of the present invention, the composition of a spatial correlation matrix is as follows:

$$R^p = \sum_{k=1}^{K}\sum_{n=1}^{N} Z^p[k,n]Z^p[k,n]^*$$

Here, $Z^p[k,n]=[Z_1^p[k,n],\ldots,Z_M^p[k,n]]^T$ is a vector. In the above formula, the spatial correlation matrix is constructed by K sub-carriers and N symbols. The null steering weight is calculated based on the spatial correlation matrix, as illustrated in the following formula:

$w=(R^p)^{-}\cdot s$

Here, s is the estimation vector of the wanted signal. In order to suppress the interference effectively, it is required to be capable of differentiating the spatial characteristic of the interference and the wanted signal. In addition, $R^p$ may be used to acquire the spatial characteristic of the interference through the observation window. Employing the above sub-carrier allocation scheme can reduce the interference.

Figure 8:
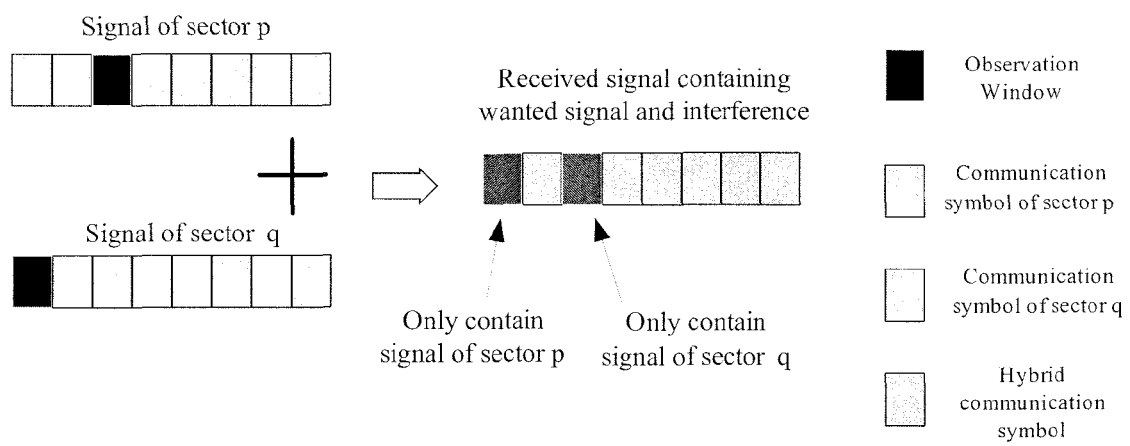
FIG. 8 is a schematic diagram illustrating an observation method for multi-cell interference.

FIG. 8 explains an observation method for multi-cell interference. Only one sub-carrier and eight symbols are shown in FIG. 8. Both the sector p and the sector q define a symbol as the observation window of the transmitting signal, but the position of the observation window of different sectors is different from each other. Assuming that the signal reaches the receiver synchronously, the receiver of the sector p may identify the interference from the sector q through the observation window of the sector p.

Figure 9:
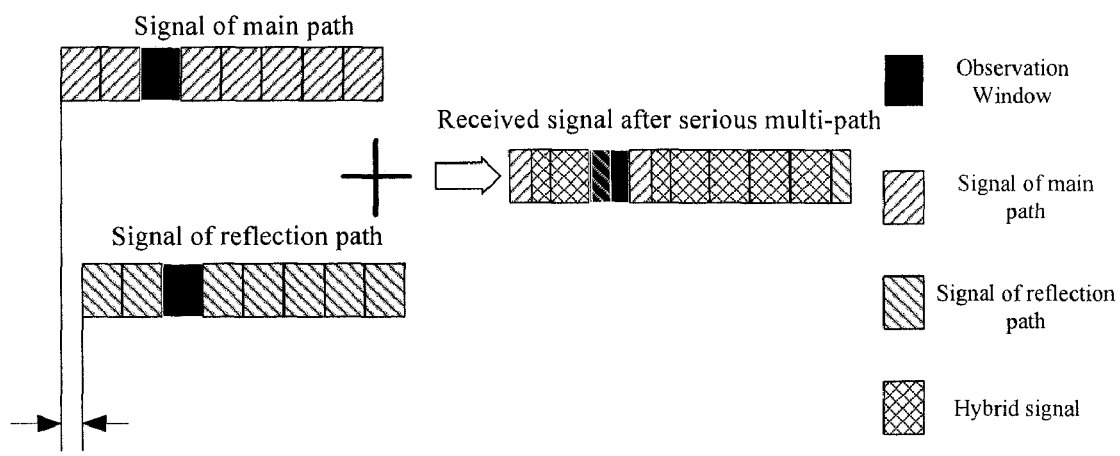
FIG. 9 is a schematic diagram illustrating an observation method for self-interference resulted from serious multi-path.

Likewise, employing such transmission method may also reduce self-interference resulted from serious multi-path. FIG. 9 represents the signal received in a multi-path channel. The receiver is synchronous with the strong signal from the main path. However, the receiver also receives the signal from the reflection path, which has a time delay τ relative to the main path. If τ is larger than the $T_{cp}$ of the OFDMA symbol, the orthogonality is destroyed, and part of the signal energy from the reflection path may leak into the signal of the main path. The observation window can detect the leakage, and the nulling algorithm can suppress such interference.

Figure 10:
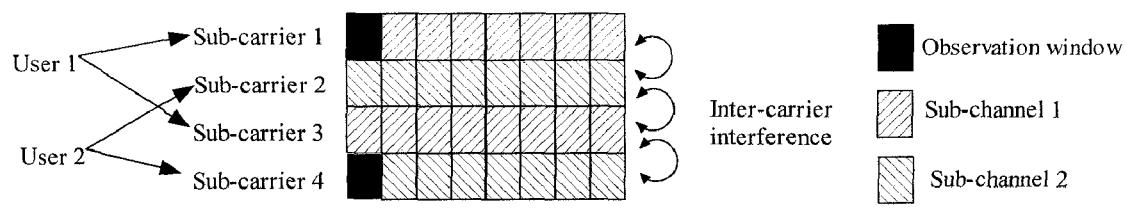
FIG. 10 is a schematic diagram illustrating an observation method for multi-access interference resulted from inter-carrier interference.

In an ideal channel, if the sub-channel sets allocated to various users does not overlap with each other, multi-access interference may not occur in the OFDMA system. However, in the case that the delay spread resulted from serious multi-path is relatively large, the Doppler spread resulted from high-speed movement is relatively large, or it is unable to avoid the non-linear/phase noise of the wireless frequency line and the multi-access interference resulted from the inter-carrier interference, the system performance may significantly decrease. Typically, the inter-carrier interference fades as the frequency interval between the working sub-carrier and the interference sub-carrier increases. As the interval is larger, the inter-carrier interference is smaller. Therefore, to allocate the working sub-carriers of the same user farther from each other, and meanwhile to allocate the working sub-carriers of different users nearer to each other, are more advantageous. The inter-carrier interference from the same user is reduced by the frequency interval, and meanwhile the spatial time-frequency characteristic of the inter-carrier interference from another user is observed at the observation window and is suppressed by the nulling algorithm. FIG. 10 gives an example, where the combination processing of sub-carrier allocation and multiple antennae can reduce the inter-carrier interference. The four sub-carriers in FIG. 10 are the first four sub-carriers (the sub-carrier 1, the sub-carrier 2, the sub-carrier 3 and the sub-carrier 4) shown in part (a) of FIG. 6. The user 1 is allocated with the sub-channel 1, the sub-carriers of which are the sub-carrier 1 and the sub-carrier 3; and the user 2 is allocated with the sub-channel 2, the sub-carriers of which are the sub-carrier 2 and the sub-carrier 4. Because the sub-carriers allocated to any of the users are not adjacent to each other, the self-interference can be avoided. On the other hand, the inter-carrier interference from the adjacent sub-carriers is produced by the other user, and in most situations, due to the difference in the spatial characteristic of the user, such interference can be suppressed using adaptive array processing.

Figure 11:
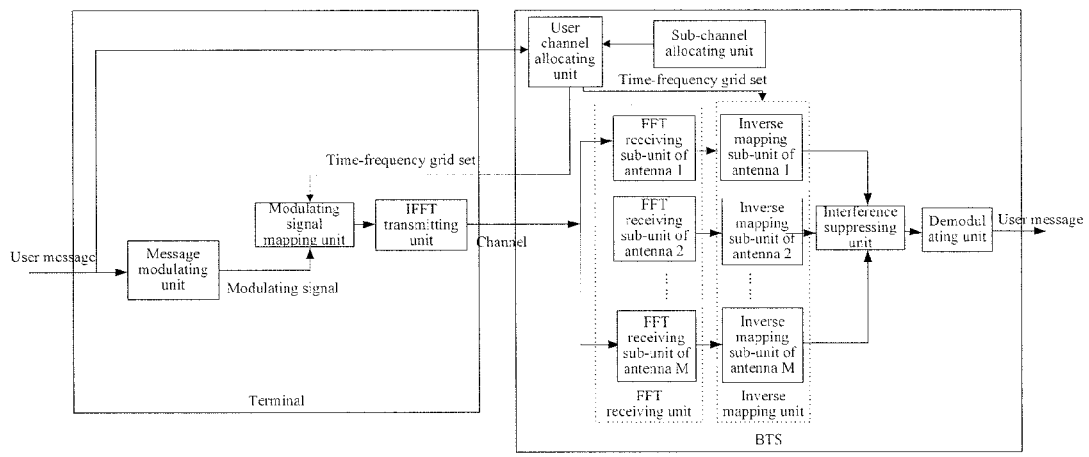
FIG. 11 is a schematic diagram illustrating a user signal transmitting system in an OFDMA smart antenna system according to an embodiment of the present invention; and, FIG. 12 is a schematic diagram illustrating a user signal transmitting system in an OFDMA smart antenna system according to an embodiment of the present invention.

FIG. 11 is a schematic diagram illustrating a user signal transmitting system in an OFDMA smart antenna system according to an embodiment of the present invention. As illustrated in FIG. 11, the system includes a terminal and a BTS. Specifically, the terminal includes: a message modulating unit, a modulating signal mapping unit, and an IFFT transmitting unit. The BTS includes: a sub-channel allocating unit, a user channel allocating unit, and an FFT receiving unit (which includes M FFT receiving sub-units), an inverse mapping unit (which includes M inverse mapping sub-units), an interference suppressing unit, and a demodulating unit. Here, M is the quantity of the antenna, and M is larger than or equal to 1. Each antenna corresponds to an FFT receiving sub-unit and an inverse mapping sub-unit, such as the FFT receiving unit of the antenna 1 and the inverse mapping sub-unit of the antenna 1, the FFT receiving sub-unit of the antenna 2 and the inverse mapping sub-unit of the antenna 2, . . . , the FFT receiving sub-unit of the antenna M and the inverse mapping sub-unit of the antenna M as shown in FIG. 11. The above units may be implemented in any software element or hardware logic element being capable of accomplishing the corresponding calculation.

The message modulating unit is adapted to perform forward error correction control encoding on the user message to be sent to obtain the coded bits, then to perform a bit permutation on the coded bits, to convert the permuted bits into channel symbol vectors based on an assigned modulation scheme, and to output the symbol vectors as the modulating signal of the user to the modulating signal mapping unit. Preferably, the message modulating unit further includes a transformation matrix module, adapted to multiply each channel symbol vector by a transformation matrix, and to use the symbol vectors resulted from the multiplication as the modulating signal of the user.

The sub-channel allocating unit is adapted to divide all the time-frequency grids of each timeslot into multiple sub-channels and output the same to the user channel allocating unit, and to arrange the sub-channel according to a manner as follows: each sub-channel includes $N_f$ sub-carriers overlapping in time, where $N_f \geq 4$; the $N_f$ sub-carriers included in each sub-channel are divided into $r \geq 1$ groups, where and each group includes $N_f/r$ sub-carriers; the $N_f/r$ sub-carriers of the dth group of each sub-channel are distributed uniformly, in which the frequency interval between the sub-carrier i and the sub-carrier i+1 is $k_i^d - k_{(i+1)}^d = p$, here $k_i^d$ is an integer, which represents the frequency position of the i th sub-carrier of the d th group in the whole spectrum band; and the frequency interval between the sub-carrier i of the d th group and the (d+1)th group of each sub-channel is equal to $k_i^d - k_i^{d+1} = q$, where q<p. Preferably, q=2, and r>1.

The user channel allocating unit is adapted to receive the user message of the user, and to allocate a time-frequency grid set to the user and output the same to the modulating signal mapping unit, where the time-frequency grid set is the union set of one or more sub-channels, and the quantity of the sub-channels is determined by the size of the user message to be sent. Preferably, in the allocated time-frequency grid set, there are no such two adjacent sub-carriers that respectively belong to different sub-channels. Here, the time-frequency grid set is allocated by the user channel allocating unit contained in the BTS. The time-frequency grid set according to the embodiment of the present invention is not limited to being allocated by the BTS, but may also be allocated by another entity at network side.

The modulating signal mapping unit is adapted to map the modulating signal of the user from the message modulating unit to the time-frequency grid set that is output from the user channel allocating unit, to insert null signal(s) into one or more time-frequency grids of each sub-channel, and to generate the frequency-domain signal of the user and output the same to the IFFT transmitting unit. Preferably, in the user channel allocating unit, the base stations of various sectors communicates with the terminal using the same division manner of the sub-channel to the time-frequency grid; and meanwhile in the modulating signal mapping unit, the positions of the null signals of each sub-channel are different from each other.

The IFFT transmitting unit is adapted to perform Inverse Fast Fourier Transform on the frequency-domain signal of the user from the modulating signal mapping unit to generate the time-domain signal of the user, and to transmit the same through the channel.

Each reception antenna is installed with an FFT receiving sub-unit and an inverse mapping sub-unit. Specifically, the FFT receiving sub-unit is adapted to receive the time-domain signal of the user from the IFFT transmitting unit, and to perform Fast Fourier Transform on the received time-domain signal of the user to generate the frequency-domain signal of the user, and to output the same to the inverse mapping sub-unit in the antenna where it is located. Each inverse mapping sub-unit is adapted to perform inverse mapping on the Fast Fourier Transformed signal from the FFT receiving sub-unit based on the time-frequency grid set allocated to the user to obtain the modulating signal of the user.

The interference suppressing unit is adapted to learn the spatial and time-frequency characteristic of the interference using the null signal(s) of each sub-channel in the modulating signals of the user that is received by the multiple antennae, and to combine the modulating signal of the user that is obtained by each antenna based on each allocated sub-channel to achieve interference suppression. Here, if M=1, it is indicated that the BTS has a single antenna, the processing process in this case is as follows: the FFT receiving unit receives the time-domain signal of the user from the IFFT transmitting unit to perform Fast Fourier Transform, generates the frequency-domain signal of the user and outputs the same to the inverse mapping unit, and the inverse mapping unit outputs the modulating signal of the user to the interference suppressing unit after performing inverse mapping; and at this time, there is no need for the interference suppressing unit to perform the combination processing, and the interference suppression may be directly performed on the modulating signal of the user from the inverse mapping unit.

The demodulating unit is adapted to demodulate the modulating signal of the user from the interference suppressing unit that is obtained by the combination to obtain the user message.

Figure 12:
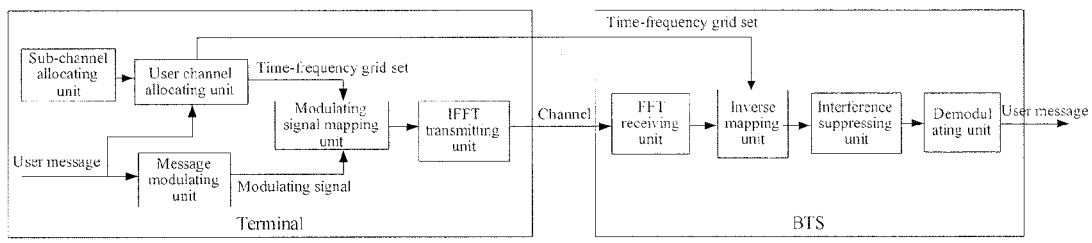

FIG. 11 shows the user signal transmitting process in the uplink, and the corresponding user signal transmitting process in the downlink is as illustrated in FIG. 12. FIG. 12 is a schematic diagram illustrating the user signal transmitting system of the OFDMA smart antenna system according to an embodiment of the present invention. In FIG. 12, the system includes a terminal and a BTS. Specifically, the BTS includes: a sub-channel allocating unit, a user channel allocating unit, a message modulating unit, a modulating signal mapping unit, and an IFFT transmitting unit. The terminal includes: an FFT receiving unit, an inverse mapping unit, an interference suppressing unit, and a demodulating unit. The functions of these modules are substantially the same as those shown in FIG. 11, and are described in brief herein as follows:

The message modulating unit is adapted to perform forward error correction control encoding on the user message to be sent to obtain the coded bits, then to perform a bit permutation on the coded bits, to convert the permuted bits into channel symbol vectors based on an assigned modulation scheme, and to output the symbol vectors as the modulating signal of the user to the modulating signal mapping unit. Preferably, the message modulating unit further includes a transformation matrix module, adapted to multiply each channel symbol vector by a transformation matrix, and to use the symbol vectors resulted from the multiplication as the modulating signal of the user.

The sub-channel allocating unit is adapted to divide all the time-frequency grids of each timeslot into multiple sub-channels and output the same to the user channel allocating unit, and to arrange the sub-channel according to the manner as illustrated in FIG. 11.

The user channel allocating unit is adapted to receive the user message of the user, and to allocate a time-frequency grid set to the user and output the same to the modulating signal mapping unit, where the time-frequency grid set is the union set of one or more sub-channels, and the quantity of the one or more sub-channels is determined by the size of the user message to be sent. Preferably, in the allocated time-frequency grid set, two adjacent sub-carriers respectively belonging to different sub-channels are not present.

The modulating signal mapping unit is adapted to map the modulating signal of the user from the message modulating unit to the time-frequency grid set that is output from the user channel allocating unit, to insert null signal(s) into one or more time-frequency grids of each sub-channel, and to generate the frequency-domain signal of the user and output the same to the IFFT transmitting unit. Preferably, in the user channel allocating unit, the base stations of various sectors communicates with the terminal using the same division manner of the sub-channel to the time-frequency grid; and meanwhile in the modulating signal mapping unit, the position of the null signal(s) of each sub-channel is different from each other.

The IFFT transmitting unit is adapted to perform Inverse Fast Fourier Transform on the frequency-domain signal of the user from the modulating signal mapping unit to generate the time-domain signal of the user, and to transmit the same through the channel.

The FFT receiving unit is adapted to receive the time-domain signal of the user from the IFFT transmitting unit, and to perform Fast Fourier Transform on the received time-domain signal of the user to generate the frequency-domain signal of the user, and to output the same to the inverse mapping unit.

The inverse mapping unit is adapted to perform inverse mapping on the signal with the Fast Fourier Transform being performed from the FFT receiving unit based on the time-frequency grid set allocated to the user to obtain the modulating signal of the user.

The interference suppressing unit is adapted to learn the spatial and time-frequency characteristic of the interference using the null signal(s) of each sub-channel in the modulating signal of the user that is received from the inverse mapping unit, and perform interference suppression on the modulating signal based on each sub-channel allocated.

The demodulating unit is adapted to demodulate the modulating signal of the user from the interference suppressing unit to obtain the user message.

Besides, the system as illustrated in FIG. 11 and FIG. 12 may be combined, to form a system having both the uplink user signal transmitting mechanism as illustrated in FIG. 11 and the downlink user signal transmitting mechanism as illustrated in FIG. 12. The specific operation principle of such system is not repeated herein.

It can be understood based on the above method and user signal transmitting system according to the embodiment of the present invention that, the embodiment of the present invention further provides a user signal transmitting apparatus, which mainly includes two types as follows: 1. the internal composition structure and the operation principle is as the terminal as illustrated in FIG. 11, which includes: the message modulating unit, the modulating signal mapping unit, and the IFFT transmitting unit; 2. the internal composition structure and the operation principle is as the BTS as illustrated in FIG. 12, which includes: the message modulating unit, the sub-channel allocating unit, the user channel allocating unit, the modulating signal mapping unit, and the IFFT transmitting unit. The embodiment of the present invention further provides a user signal receiving apparatus, which mainly includes two types as follows: 1. the internal composition structure and the operation principle is as the BTS as illustrated in FIG. 11, which includes: the sub-channel allocating unit, the user channel allocating unit, the FFT receiving unit (which may contain several FFT receiving sub-units if the BTS has multiple antennae), the inverse mapping unit (which may contain several inverse mapping sub-units if the BTS has multiple antennae), the interference suppressing unit, and the demodulating unit; 2. the internal composition structure and the operation principle is as the terminal as illustrated in FIG. 12, which includes: the FFT receiving unit, the inverse mapping unit, the interference suppressing unit, and the demodulating unit. Correspondingly, the embodiment of the present invention also provides a user signal transmitting method (corresponding to the above user signal transmitting apparatus) and a user signal receiving method (corresponding to the above user signal receiving apparatus). Here, the processing procedure and the operation principle related to the user signal transmitting method and apparatus as well as the user signal receiving method and apparatus are not repeated.

The signal design, production and allocation method proposed by the present invention in combination with the smart antenna can reduce various interference of the receiver, greatly improve the signal reception quality, enhance the entire performance of the wireless system, and make the OFDMA system achieve particularities as follows: the subcarrier can be flexibly arranged according to service requirements; the frequency or time selective fading can be avoided; the multi-cell interference of narrowband and broadband communication can be suppressed; the self-interference resulted from serious multi-path time delay spread can be reduced; the self-interference resulted from the circuit non-linear or phase noise occurring with the receiving/transmitting chain can be reduced; and the self-interference resulted from the Doppler spread of the mobile channel can also be reduced.

The foregoing is merely preferred embodiments of the present invention, and the scope of the present invention is not limited thereto. Any modifications, equivalents or improvements made without departing from the spirit and principle of the present invention are intended to fall into the scope of the present invention.

The invention claimed is:

1. A user signal transmitting method in an Orthogonal Frequency-Division Multiple Access (OFDMA) system, wherein the OFDMA system comprises multiple terminals and multiple Base Transceiver Stations (BTSs), a user communicates with the (BTSs) via the terminals, and in an OFDMA access manner, a radio resource is divided into multiple two-dimensional time-frequency grids, and wherein all the two-dimensional time-frequency grids of each timeslot are divided into multiple sub-channels, in which each sub-channel comprises $N_f$ sub-carriers overlapping in time, where $N_f \geq 4$, and in the $N_f$ sub-carriers comprised in each sub-channel, a maximum value of a frequency interval between adjacent sub-carriers is three times or more than three times of a minimum value of the frequency interval between the adjacent sub-carriers; and, when any one of the terminals and BTSs acts as a transmitter used for transmitting a user message of the user, the method comprises:

generating a modulating signal of the user based on the user message to be sent;

mapping the modulating signal of the user to a two-dimensional time-frequency grid set allocated by a network side to the user, to generate a frequency-domain signal of the user, wherein the two-dimensional time-frequency grid set is a union set of one or more sub-channels, in which a quantity of the one or more sub-channel is determined by a size of the user message, and a time-frequency position of the sub-channel is selected according to a predetermined rule; and, performing Inverse Fast Fourier Transform on the frequency-domain signal of the user to generate a time-domain signal of the user, and transmitting the time-domain signal.

2. The method according to claim 1, wherein said generating the modulating signal of the user comprises:

performing forward error correction control encoding on the user message to obtain coded bits;

performing a bit permutation on the coded bits;

converting the permuted bits into multiple channel symbol vectors based on an assigned modulation scheme; and, using the channel symbol vectors as the modulating signal of the user, or multiplying each channel symbol vector by a transformation matrix and using the transformed channel symbol vectors as the modulating signal of the user.

3. The method according to claim 1, wherein, the $N_f$ sub-carriers comprised in each sub-channel are grouped into r groups, where $r \geq 1$, and each group comprises $N_f/r$ sub-carriers;

the $N_f/r$ sub-carriers of a d th group of each sub-channel are distributed uniformly, in which the frequency interval between a ith sub-carrier and the (i+1) th sub-carrier is $k_i^d - k_{(i+1)}^d = p$, where $k_i^d$ is an integer, which represents a frequency position of the i th sub-carrier of the d th group in a whole spectrum band; and, for each sub-channel, the frequency interval between the i th sub-carrier of the d th group and the ith sub-carrier of the (d+1) th group is equal to $k_i^d - k_{(i+1)}^d = q$, where $q < p$.

4. The method according to claim 1, wherein the predetermined rule used for selecting the time-frequency position of the sub-channel comprises: in the two-dimensional time-frequency grid set allocated to the user, there are no such two adjacent sub-carriers that respectively belong to different sub-channels.

5. The method according to claim 1, wherein when generating the frequency-domain signal of the user, the method further comprises: inserting one or more null signals respectively into one or more two-dimensional time-frequency grids comprised in each sub-channel, where, the one or more null signals inserted into each sub-channel are used for a receiver to learn a spatial and time-frequency characteristic of an interference.

6. The method according to claim 5, wherein when communicating with the terminals, the BTSs of different sectors uses the same method for dividing all the two-dimensional time-frequency grids of each timeslot into multiple sub-channels; and, for any two adjacent sectors, the position of the one or more null signals inserted into each sub-channel are different from each other.

7. The method according to claim 5, further comprising: when the receiver of the user message has multiple antennae, using each null signal inserted into each sub-channel that is received by the multiple antennae to construct a spatial covariance matrix.

8. A user signal receiving method in an Orthogonal Frequency-Division Multiple Access (OFDMA) system, wherein the OFDMA system comprises multiple terminals and multiple Base Transceiver Stations (BTSs), a user communicates with the BTSs via the terminals, and in an OFDMA access manner, a radio resource is divided into multiple two-dimensional time-frequency grids, and wherein all the two-dimensional time-frequency grids of each timeslot are divided into multiple sub-channels, in which each sub-channel comprises $N_f$ sub-carriers overlapping in time, where $N_f \geq 4$, and in the $N_f$ sub-carriers comprised in each sub-channel, a maximum value of a frequency interval between adjacent sub-carriers is three times or more than three times of a minimum value of the frequency interval between the adjacent sub-carriers; and, when any one of the terminals and BTSs acts as a receiver used for receiving a user message of the user, the method comprises:

performing, in turn, Fast Fourier Transform and inverse mapping on a time-domain signal of the user to obtain a modulating signal of the user, wherein the inverse mapping is based on a two-dimensional time-frequency grid set allocated by a network side to the user, where the two-dimensional time-frequency grid set is a union set of one or more sub-channels, in which a quantity of the one or more sub-channels is determined by a size of the user message, and a time-frequency position of the sub-channel is selected according to a predetermined rule;

learning a spatial and time-frequency characteristic of an interference from one or more null signals respectively in one or more two-dimensional time-frequency grids comprised in each sub-channel using the modulating signal of the user, and performing interference suppression using the spatial and time-frequency characteristic of the interference obtained from the learning, wherein the one or more null signals are inserted into the one or more two-dimensional time-frequency grids comprised in each sub-channel by a transmitter of the user message in generating a frequency-domain signal; and, demodulating the modulating signal of the user with the interference suppression being performed to obtain the user message of the user.

9. The method according to claim 8, further comprising: when the receiver has multiple antennae, learning the spatial and time-frequency characteristic of the interference using the modulating signals of the user that has been processed by the multiple antennae, combining the modulating signals of the user resulted from the processing of the multiple antennae, and performing the interference suppression using the spatial and time-frequency characteristic of the interference obtained from the learning.

10. The method according to claim 9, further comprising: constructing a spatial covariance matrix using each null signal in each sub-channel of the modulating signals of the user that is received by the multiple antennae.

11. The method according to claim 8, wherein when communicating with the terminal, the BTSs of different sectors uses the same method of dividing all the two-dimensional time-frequency grids of each timeslot into multiple sub-channels; and, for any two adjacent sectors, the position of the one or more null signals inserted into each sub-channel are different from each other.

12. A user signal transmitting apparatus in an Orthogonal Frequency-Division Multiple Access (OFDMA) system, wherein in an OFDMA access manner, a radio resource is divided into multiple two-dimensional time-frequency grids, and wherein all the two-dimensional time-frequency grids of each timeslot are divided into multiple sub-channels, in which each sub-channel comprises $N_f$ sub-carriers overlapping in time, where $N_f \geq 4$, and in the $N_f$ sub-carriers comprised in each sub-channel, a maximum value of a frequency interval between adjacent sub-carriers is three times or more than three times of a minimum value of the frequency interval between the adjacent sub-carriers; and, the apparatus comprises:

a message modulating unit, adapted to generate a modulating signal of a user based on a user message to be sent from the user;

a modulating signal mapping unit, adapted to map the modulating signal of the user from the message modulating unit to a two-dimensional time-frequency grid set allocated by a network side to the user, to generate a frequency-domain signal of the user, wherein the two-dimensional time-frequency grid set is a union set of one or more sub-channels, in which a quantity of the one or more sub-channels is determined by a size of the user message, and a time-frequency position of the sub-channel is selected according to a predetermined rule; and an Inverse Fast Fourier Transform (IFFT) transmitting unit, adapted to perform Inverse Fast Fourier Transform on the frequency-domain signal of the user from the modulating signal mapping unit to generate a time-domain signal of the user, and to transmit the time-domain signal.

13. The apparatus according to claim 12, further comprising:

a sub-channel allocating unit, adapted to divide all the two-dimensional time-frequency grids of each timeslot into multiple sub-channels, in which each sub-channel comprises $N_f$ sub-carriers overlapping in time, where $N_f \geq 4$, and in the $N_f$ sub-carriers comprised in each sub-channel, the maximum value of the frequency interval between the adjacent sub-carriers is three times or more than three times of the minimum value of the frequency interval between the adjacent sub-carriers; and, a user channel allocating unit, adapted to allocate a two-dimensional time-frequency grid set for the user, wherein the two-dimensional time-frequency grid set is the union set of the one or more sub-channels divided by the sub-channel allocating unit, to determine the quantity of the one or more sub-channels according to the size of the user message, and to select the time-frequency position of the sub-channel according to the predetermined rule, wherein, the modulating signal mapping unit is further adapted to map the modulating signal of the user to the two-dimensional time-frequency grid set allocated by the user channel allocating unit to the user.

14. The apparatus according to claim 13, wherein the sub-channel allocating unit is further adapted to arrange the sub-channel according to a manner as follows: the $N_f$ sub-carriers comprised in each sub-channel are grouped into r groups, where $r \geq 1$, and each group comprises $N_f/r$ sub-carriers; the $N_f/r$ sub-carriers of a d th group of each sub-channel are distributed uniformly, in which the frequency interval between a ith sub-carrier and the (i+1) th sub-carrier is $k_i^d - k_{(i+1)}^d = p$, where $k_i^d$ is an integer, which represents a frequency position of the i th sub-carrier of the d th group in a whole spectrum band; and for each sub-channel, the frequency interval between the ith sub-carrier of the d th group and the ith sub-carrier of the (d+1) th group is equal to $k_i^d - k_i^{i+1} = q$, where $q < p$.

15. A user signal receiving apparatus in an Orthogonal Frequency-Division Multiple Access (OFDMA) system, wherein in an OFDMA access manner, a radio resource is divided into multiple two-dimensional time-frequency grids, and wherein all the two-dimensional time-frequency grids of each timeslot are divided into multiple sub-channels, in which each sub-channel comprises $N_f$ sub-carriers overlapping in time, where $N_f \geq 4$, and in the $N_f$ sub-carriers comprised in each sub-channel, a maximum value of a frequency interval between adjacent sub-carriers is three times or more than three times of a minimum value of the frequency interval between the adjacent sub-carriers; and, the apparatus is adapted to receive a user message from a user, and comprises:

a Fast Fourier Transform FFT receiving unit, adapted to receive a time-domain signal of the user, and to perform Fast Fourier Transform on the time-domain signal of the user;

an inverse mapping unit, adapted to perform inverse mapping on the time-domain signal from the FFT receiving unit based on a two-dimensional time-frequency grid set allocated by a network side to the user to obtain a modulating signal, wherein the two-dimensional time-frequency grid set is a union set of one or more sub-channels, in which a quantity of the one or more sub-channels is determined by a size of the user message, and a time-frequency position of the sub-channel is selected according to a predetermined rule;

an interference suppressing unit, adapted to learn a spatial and time-frequency characteristic of an interference from one or more null signals in each sub-channel therein using the modulating signal from the inverse mapping unit, and to perform interference suppression on the modulating signal using the spatial and time-frequency characteristic of the interference obtained from learning; and, a demodulating unit, adapted to demodulate the modulating signal with the interference suppression being performed from the interference suppressing unit to obtain the user message.

16. The apparatus according to claim 15, further comprising:

a sub-channel allocating unit, adapted to divide all the two-dimensional time-frequency grids of each timeslot into multiple sub-channels, in which each sub-channel comprises $N_f$ sub-carriers overlapping in time, where $N_f \geq 4$, and in the $N_f$ sub-carriers comprised in each sub-channel, the maximum value of the frequency interval between the adjacent sub-carriers is three times or more than three times of the minimum value of the frequency interval between the adjacent sub-carriers; and, a user channel allocating unit, adapted to allocate a two-dimensional time-frequency grid set for the user, wherein the two-dimensional time-frequency grid set is the union set of the one or more sub-channels divided by the sub-channel allocating unit, to determine the quantity of the one or more sub-channels according to the size of the user message, and to select the time-frequency position of the sub-channel according to the predetermined rule, wherein the inverse mapping unit is further adapted to perform the inverse mapping based on the two-dimensional time-frequency grid set allocated by the user channel allocating unit to the user.

17. The apparatus according to claim 16, wherein the apparatus has multiple antennae, and, the FFT receiving unit comprises: multiple FFT receiving sub-units one-to-one corresponding to the multiple antennae, in which each FFT receiving sub-unit is located in a reception antenna, and is adapted to perform the Fast Fourier Transform on the time-domain signal of the user that is received by the antenna where it is located;

the inverse mapping unit comprises: multiple inverse mapping sub-units one-to-one corresponding to the multiple antennae, in which each inverse mapping unit is located in a reception antenna, and is adapted to perform the inverse mapping on the signal from the FFT receiving sub-unit located in the same antenna as itself to obtain the modulating signal; and, the interference suppressing unit is further adapted to learn the spatial and time-frequency characteristic of the interference using the modulating signal from the multiple inverse mapping sub-units, and to combine the modulating signal from the multiple inverse mapping sub-units to achieve the interference suppression.

18. A user signal transmitting system of Orthogonal Frequency-Division Multiple Access (OFDMA), comprising: at least one Base Transceiver Station (BTS) and at least one terminal, wherein a user communicates with the BTS via the terminal, and in an OFDMA access manner, a radio resource is divided into multiple two-dimensional time-frequency grids, and wherein:

the terminal is adapted to generate, when transmitting a user message of the user to the BTS, a modulating signal of the user based on the user message to be sent; to map the modulating signal of the user to a two-dimensional time-frequency grid set allocated by the BTS to itself, and to insert one or more null signals respectively into one or more two-dimensional time-frequency grids comprised in each sub-channel to generate a frequency-domain signal of the user; and to perform Inverse Fast Fourier Transform on the frequency-domain signal of the user to generate a time-domain signal of the user, and to transmit the time-domain signal; and, the BTS is adapted to allocate sub-channels, wherein all the two-dimensional time-frequency grids of each timeslot are divided into multiple sub-channels, in which each sub-channel comprises $N_f$ sub-carriers overlapping in time, where $N_f \geq 4$, and in the $N_f$ sub-carriers comprised in each sub-channel, a maximum value of a frequency interval between adjacent sub-carriers is three times or more than three times of a minimum value of the frequency interval between the adjacent sub-carriers; to allocate a two-dimensional time-frequency grid set to the user when receiving the user message from the terminal, wherein the two-dimensional time-frequency grid set is a union set of one or more sub-channels, in which a quantity of the one or more sub-channels is determined by a size of the user message, and a time-frequency position of the sub-channel is selected according to a predetermined rule; to perform, in turn, Fast Fourier Transform and inverse mapping on the time-domain signal of the user from the terminal to obtain the modulating signal of the user; to learn a spatial and time-frequency characteristic of an interference from one or more null signals respectively in one or more two-dimensional time-frequency grids comprised in each sub-channel using the modulating signal of the user, and to perform interference suppression on the modulating signal of the user using the spatial and time-frequency characteristic of the interference obtained from the learning, and to demodulate the modulating signal of the user with the interference suppression being performed to obtain the user message of the user.

19. The system according to claim 18, wherein the BTS has multiple antennae; and, the multiple antennae of the BTS are adapted to respectively perform, in turn, the Fast Fourier Transform and the inverse mapping on various received time-domain signals of the user to obtain the modulating signal of the user; the BTS is further adapted to learn the spatial and time-frequency characteristic of the interference from the one or more null signals in the one or more two-dimensional time-frequency grids comprised in each sub-channel using the modulating signals of the user received by the multiple antennae, to combine the modulating signals of the user that has been processed by the multiple antennae, and to perform the interference suppression using the spatial and time-frequency characteristic of the interference obtained from learning.

20. A user signal transmitting system of Orthogonal Frequency-Division Multiple Access (OFDMA), comprising: at least one Base Transceiver Station (BTS) and at least one terminal, wherein a user communicates with the BTS via the terminal, and in an OFDMA access manner, a radio resource is divided into multiple two-dimensional time-frequency grids, and wherein:

the BTS is adapted to allocate sub-channels, wherein all the two-dimensional time-frequency grids of each timeslot are divided into multiple sub-channels, in which each sub-channel comprises $N_f$ sub-carriers overlapping in time, where $N_f \geq 4$, and in the $N_f$ sub-carriers comprised in each sub-channel, a maximum value of a frequency interval between adjacent sub-carriers is three times or more than three times of a minimum value of the frequency interval between the adjacent sub-carriers; to generate, when transmitting a user message of the user to the terminal, a modulating signal of the user based on the user message to be sent; to map the modulating signal of the user to a two-dimensional time-frequency grid set allocated by itself to the user, and to insert one or more null signals respectively into one or more two-dimensional time-frequency grids comprised in each sub-channel to generate a frequency-domain signal of the user; and to perform Inverse Fast Fourier Transform on the frequency-domain signal of the user to generate a time-domain signal of the user, and to transmit the time-domain signal, wherein the two-dimensional time-frequency grid set is a union set of one or more sub-channels, in which a quantity of the one or more sub-channels is determined by a size of the user message, and a time-frequency position of the sub-channel is selected according to a predetermined rule; and, the terminal is adapted to perform, in turn, Fast Fourier Transform and inverse mapping on the time-domain signal of the user from the BTS, to obtain the modulating signal of the user, to learn a spatial and time-frequency characteristic of an interference from the one or more null signals in the one or more two-dimensional time-frequency grids comprised in each sub-channel using the modulating signal of the user; and to perform interference suppression on the modulating signal of the user using the spatial and time-frequency characteristic of the interference obtained from learning, and to demodulate the modulating signal of the user with the interference suppression being performed to obtain the user message of the user.

* * * * *